March 23, 1926.  1,577,896
J. A. CVRCEK ET AL
LUGGAGE CARRIER FOR VEHICLES
Filed Jan. 12, 1925
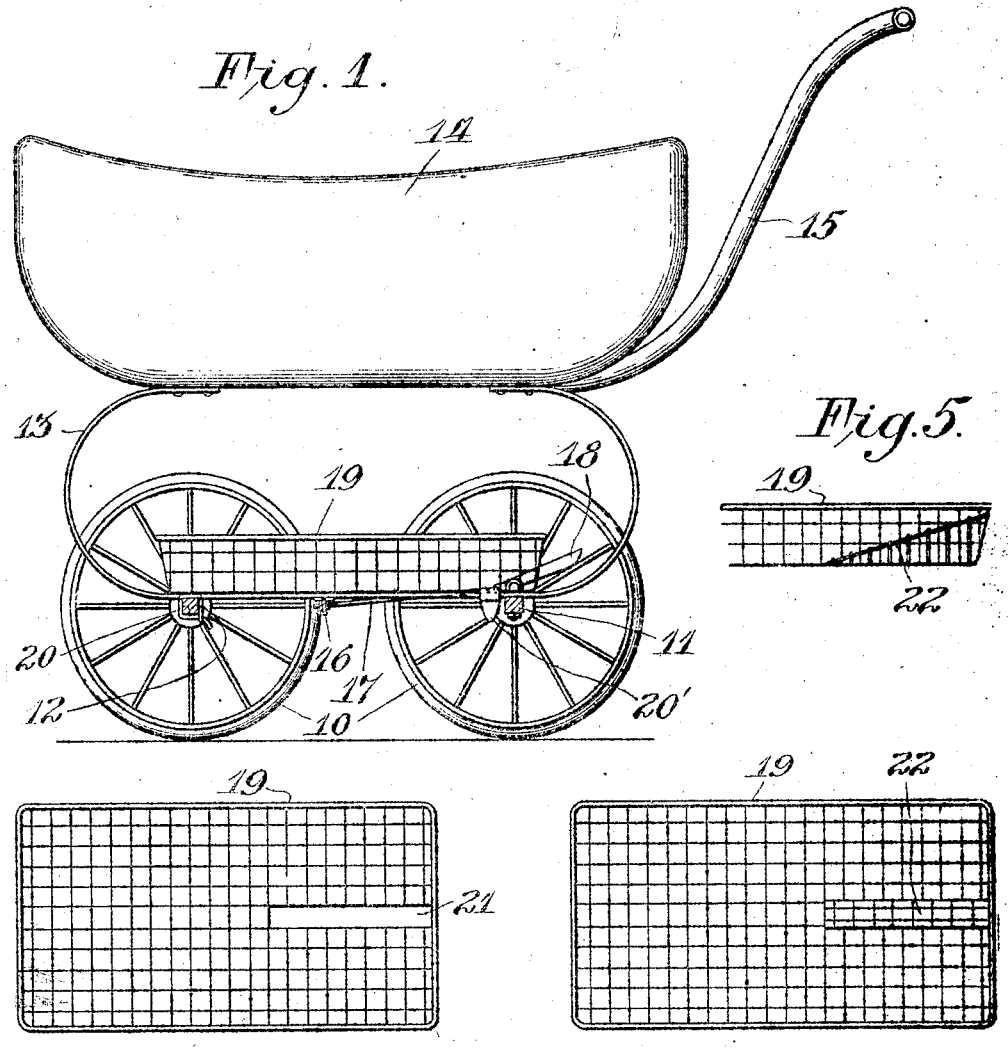
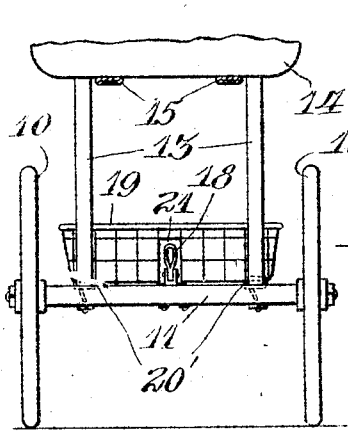
Inventors.
James A. Cvrcek
and Anna H. Cvrcek,
By Paul O. Pippel
Atty.

Patented Mar. 23, 1926.

1,577,896

UNITED STATES PATENT OFFICE.

JAMES A. CVRCEK AND ANNA H. CVRCEK, OF CHICAGO, ILLINOIS.

LUGGAGE CARRIER FOR VEHICLES.

Application filed January 12, 1925. Serial No. 1,743.

*To all whom it may concern:*

Be it known that we, JAMES A. CVRCEK and ANNA H. CVRCEK, citizens of the United States, and residents, respectively, of Chicago, in the county of Cook and State of Illinois, and of Chicago, in the county of Cook and State of Illinois, have invented certain new and useful Improvements in Luggage Carriers for Vehicles, of which the following is a full, clear, and exact specification.

Our invention relates to wheeled vehicles such as perambulators or baby carriages, and particularly to luggage carriers therefor.

Most mothers in operating these baby carriages, especially when marketing, have experienced the difficulty and necessity of having to place the various articles purchased in the body of these vehicles along with the child, which is, of course, objectionable, particularly so, where the child is restless.

It is, therefore, the main object of our invention to overcome this difficulty by providing a luggage carrier adapted to use as an attachment for vehicles of the kind mentioned, which may be utilized in the carrying of luggage.

It is a further object of our invention to provide a luggage carrier of simple and cheap construction, which may be attached and placed on baby carriages of standard construction without detracting from the pleasing appearance of such vehicles.

Other important objects of this invention will appear to those skilled in this art as the description thereof progresses.

Our invention has been illustrated in the accompanying sheet of drawings wherein like characters of reference denote like parts throughout the several views, and wherein—

Fig. 1 is a side elevational view of a baby carriage with the improved luggage carrier of our invention shown in place thereon;

Fig. 2 is an end elevation of the same construction looking from the right in Fig. 1;

Fig. 3 is a plan view of the luggage carrier;

Fig. 4 is a view similar to Fig. 3, but with the carrier slightly modified; and

Fig. 5 is a fragmentary side view of the construction shown in Fig. 4.

Our improved luggage carrier has been illustrated in the preferred embodiment in connection with a perambulator of standard construction comprising the usual supporting wheels 10, a rear axle 11 and a front axle 12, said axles supporting the usual longitudinally arranged, elliptical spring frame members 13 to which is securely fastened the body 14 of the vehicle. The usual push, or handle-bars 15 are also shown fastened to the body of the vehicle. The conventional braking mechanism comprising a brake bar 16 engageable with the front wheels and actuable by the link 17 controlled by a foot latch 18 mounted for pivotal movement on the rear axle 11 is also shown.

The improved luggage carrier of our present invention comprises a basket 19, preferably of wire net-work, and is disposed on the lower runs of the longitudinal frame members 13, where it may be securely fastened by any suitable means such as flexible straps 20; in the illustration there being employed two straps 20 (only one being shown) fastening the basket to the front axle and two straps 20' fastening the rear end of the basket to the frame members 13. It is to be understood, of course, that the particular method of fastening herein shown may be varied without departing from the scope of our invention.

To prevent interference with the brake actuating mechanism including the link 17 and latch 18, a slot or passageway 21 is centrally and longitudinally arranged along the bottom of one end of the basket to provide a clearance for the said brake actuating mechanism, as shown clearly in Figs. 2 and 3.

In Figs. 4 and 5, a modification has been shown illustrating a bridge 22 formed integrally with the basket and extending over the slot 21 so that movement of the brake actuating mechanism cannot interfere with and jumble any luggage carried in the basket.

It will thus be seen that we have herein provided a luggage carrier in which the several objects of our invention are achieved and that the same is of simple construction and well adapted for use with baby carriages now in general use.

It is to be understood that the forms of our invention herein shown and described are to be taken as preferred examples of the same and that various changes in the shape, size and arrangement of parts may be resorted to without departing from the spirit of the invention or the scope of the appended claims.

What we claim as our invention and desire to secure by Letters Patent is:

1. In a baby carriage having an axle and wheels, the combination of a body supporting frame carried by the axle and extending above the tops of the wheels, a body on said frame above the tops of the wheels, a brake for the wheels including brake actuating mechanism disposed above the axle, a luggage carrier comprising a basket member carried on said frame directly underneath the body and so constructed as not to interfere with the brake actuating mechanism, and means for fastening the carrier to the frame.

2. In a wheeled vehicle having axles and carrying wheels, the combination of a frame supported on the axles, a body carried on the frame above the tops of the wheels, a brake for the wheels including brake actuating mechanism disposed above the axles, a luggage carrier comprising a basket member carried by the axles and frame directly underneath said body and below the tops of the wheels, and means for preventing displacement of the basket.

3. The combination with a wheeled vehicle having a frame supported on axles and carrying a body above the tops of the wheels, a brake actuating mechanism on one of the axles, of a luggage carrier for the vehicle comprising a basket member supported on the frame directly underneath the body and below the tops of the wheels, said basket member having a passageway therein to provide clearance for the brake actuating mechanism.

4. The combination with a wheeled vehicle having axles and a frame and a brake actuating mechanism on one of the axles, and a body on the frame, of a luggage carrier comprising a basket member fixed to the frame directly underneath said body and having a centrally arranged passageway therein adjacent one end to provide clearance for the brake actuating mechanism.

5. The combination with a wheeled vehicle having axles and a frame and a brake actuating mechanism on one of the axles, and a body on the frame, of a luggage carrier comprising a basket member mounted on said frame directly underneath the body and having a slot therein adjacent the brake actuating mechanism to provide clearance therefor, and means over the slot to prevent interference of the brake actuating mechanism with luggage in the carrier.

6. The combination with a wheeled vehicle having axles and a frame and a brake actuating mechanism on one of the axles, and a body on the frame, of a luggage carrier comprising a basket member supported on said frame directly underneath the body and having a slot passageway therein adjacent the brake actuating mechanism to provide clearance therefor, and a bridge over the passageway integral with the basket member to prevent interference of the brake actuating mechanism with luggage in the carrier.

In testimony whereof we affix our signatures.

JAMES A. CVRCEK.
ANNA H. CVRCEK.